(No Model.)  2 Sheets—Sheet 1.

G. W. WORDEN.
SHIPPING CRATE.

No. 521,354. Patented June 12, 1894.

Witnesses:
D. Darley.
R. M. Elliott.

Inventor:
George W. Worden
By J. W. W. Sterling
Atty.

THE NATIONAL LITHOGRAPHING COMPANY,
WASHINGTON, D. C.

(No Model.) 2 Sheets—Sheet 2.

G. W. WORDEN.
SHIPPING CRATE.

No. 521,354. Patented June 12, 1894.

Witnesses:
D. Darley
R. M. Elliott

Inventor:
George W. Worden
By H. W. Sterling
Atty.

THE NATIONAL LITHOGRAPHING COMPANY,
WASHINGTON, D. C.

UNITED STATES PATENT OFFICE.

GEORGE W. WORDEN, OF DOVER, DELAWARE.

SHIPPING-CRATE.

SPECIFICATION forming part of Letters Patent No. 521,354, dated June 12, 1894.

Application filed February 15, 1893. Serial No. 462,467. (No model.)

*To all whom it may concern:*

Be it known that I, GEORGE W. WORDEN, a citizen of the United States, and a resident of Dover, in the county of Kent, State of Delaware, have invented certain new and useful Improvements in Shipping-Crates, of which the following is a full, clear, and exact description.

The present invention has reference to that class of crates known "gift crates," in the use of which reshipment of the crate is unnecessary as its cost of construction is less than the expense of freight incurred in returning the same.

The object of the invention, therefore, has been to construct a crate of this character which can be very cheaply manufactured and yet not at the expense of strength or its fruit-protecting functions, and in which the lightness of the crate is a consideration of great importance.

In the shipping of fruit the problem of vital importance to shippers is, to so pack the fruit as to protect it against the jars incident to shipping and handling, and to effectually provide for the free circulation of air to the fruit, and this by means of a crate which will be so simple in its construction and parts as to make cost of manufacture less than the cost of reshipment and its weight reduced to the lowest possible point thus saving in this particular in the cost of transportation.

The crate forming the subject of this specification is designed to secure the above mentioned requirements, and consists in the novel construction and arrangement of parts all as hereinafter fully set forth and pointed out in the claims.

Figure 1:
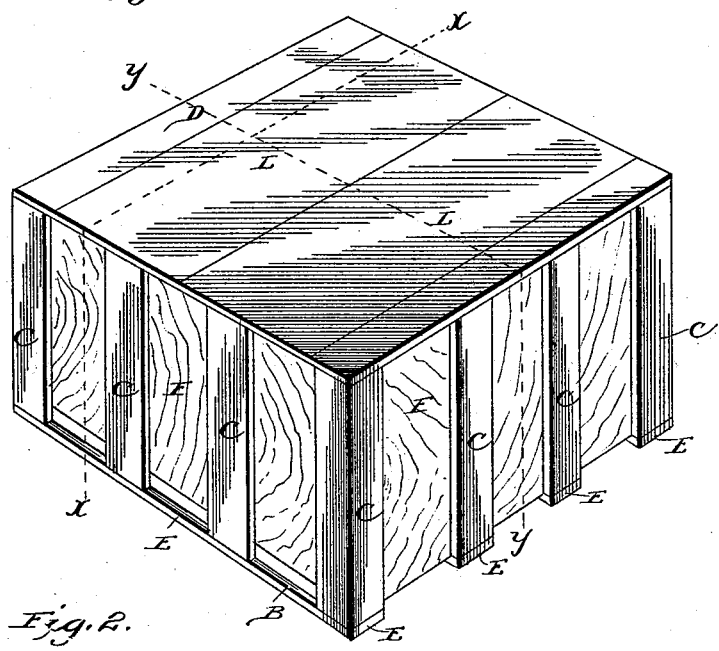
Figure 2:
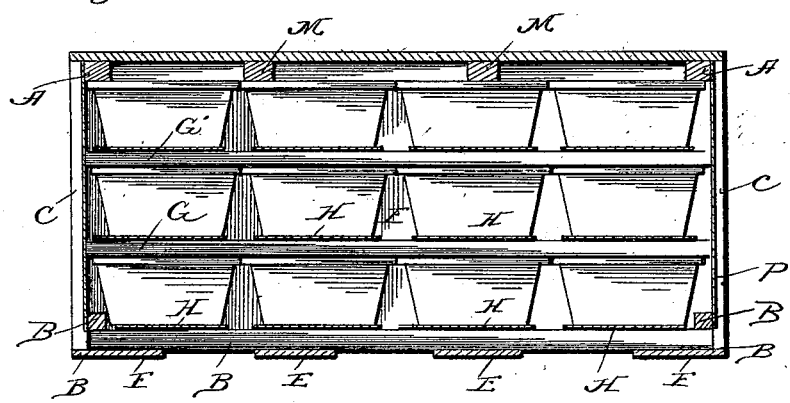
Figure 3:
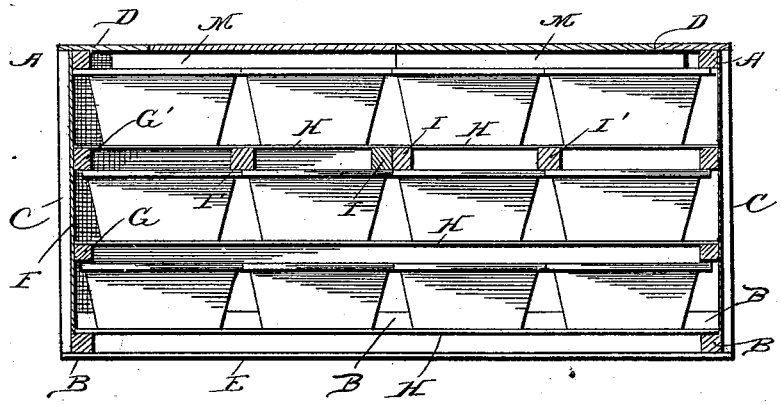
Figure 4:
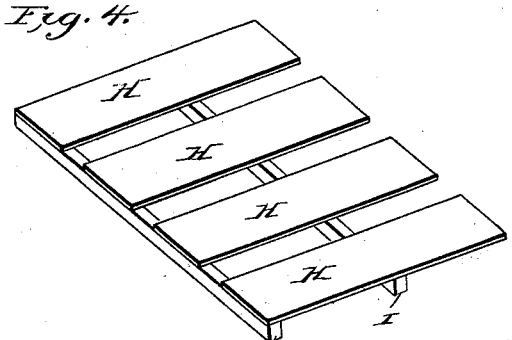
Figure 5:
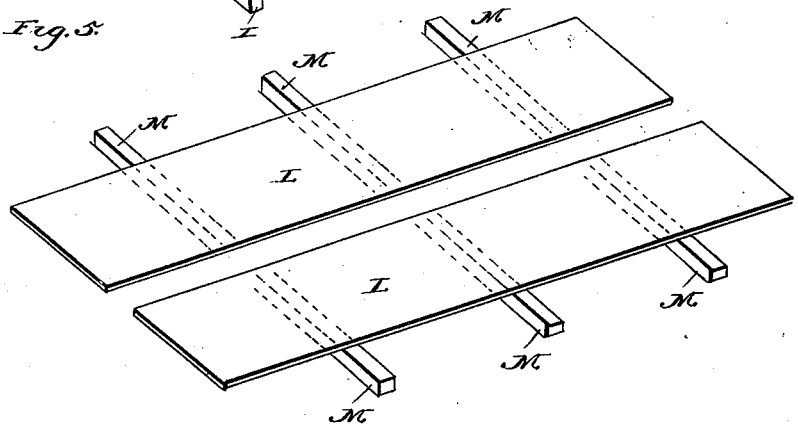

In the accompanying drawings illustrating my invention, Figure 1, is a perspective view of the crate. Fig. 2, is a vertical sectional view taken on the line $x-x$ of Fig. 1. Fig. 3, is a vertical sectional view taken on the line $y-y$ of Fig. 1. Fig. 4, is a detail view in perspective of a half section of one of the yielding racks of the top tier. Fig. 5, is also a detail view of the covers, showing projecting cleats secured to the under side thereof for engaging a permanent strip on the crate, and holding the said covers in place.

The crate as illustrated is designed particularly for shipping baskets of strawberries or other small and delicate fruit, but obviously it is suitable, by reason of its closed sides and top and bottom, for the shipment of greens, and other vegetables, as well as larger fruit as apples, without the necessity of the baskets and their supports. The present crate is square in general form and is adapted to contain three tiers of baskets of sixteen baskets to a tier.

The main feature of the construction lies in the open frame work which is light, and the walls of veneering which are so combined with and held by the frame work as to make the sides of the crate closed, while in addition thereto giving strength to the crate and being itself protected by the outer strips of the frame work. This feature will be more clearly demonstrated by reference to the drawings by letter, and in which it will be seen that there is a light rectangular frame at both top and bottom designated respectively A and B, to which are nailed the vertical strips or slats C, there being preferably four on each side and those of the corners coming together and overlapping. In addition to these vertical strips there are secured to the top frame A the end strips D, and to the bottom frame B the cross strips E. These parts of the construction just referred to constitute the frame work of the crate, which is light in material and very open, and to make of the same a perfect inclosure, without appreciably increasing the weight, or adding to its expense of making, an inner wall F is provided of veneering or thin board which is often a waste product that has but a limited use, but that can be utilized to bring about very beneficial results in the present construction of the crate.

The veneering F is cut in pieces each sufficient to cover an entire side, and these pieces are fastened between the vertical outer strips C and the rectangular frame A at the top, while the same manner of fastening may be employed at the bottom if found necessary or desirable.

Cleats G and G' are secured to the inner face of the veneering on two corresponding sides of the crate and while giving additional strength to the crate, and especially to the veneering, form supports for the yielding fruit racks or slats H, which are of thin strips, and being supported only at their ends, provide a yielding rest or support for the fruit basket. It will also be seen that there is a sufficient air space between the baskets and that the top edge of one half of the number of baskets extends under the cleats G and G', thereby holding the same securely in place.

The yielding racks H, for the bottom and middle tier are of a length sufficient to extend entirely from one side of the crate to the other, and the intermediate racks while fitting snugly therein are not permanently secured as are the bottom racks as they are designed to be removed in unloading. This removable feature is also true of the top racks H, but these instead of extending across from side to side are made in two sections in order to allow their removal, the strips D D interfering. The former one of these sections is shown in Fig. 4, and in which it will be seen that the strips are cut in half and secured to cleats I and I', and the position occupied by the sections will be seen in Fig. 3, the cleats I I, coming together and resting on the meeting edges of the central baskets, while cleats I' I' rest on the meeting edges of the central and side baskets, and by this means the upper tier of baskets is given a yielding support which is derived from the intermediate yielding racks which are the next below.

The cover of the crate is preferably in two parts L each part having cleats M, as shown in Fig. 5, which extend beyond the outer edges thereof, so that when placed on the crate the said projecting ends will extend under the permanent side strips D D and form a secure hinge-like fastening for the outer sides of the cover, while forming a leverage by which the cover may be forced down to its place, the cleats M resting on the baskets, and readily nailed to the frame A near its center, thus providing a quick and secure fastening of the top portion of the crate.

It will be obvious that when the crate is used for the shipment of large fruit, such as apples, a series of slats may be used for the cover, and the cleats M provided with a covering of veneering on their under side whereby to give a greater bearing and protect the fruit.

Having thus described my invention, what I claim as new, and desire to secure by Letters Patent, is—

1. The crate adapted to contain tiers of fruit receptacles, comprising top and bottom frames, vertical strips extending around the same at intervals apart and secured to the outer faces of said frames at the respective ends of said strips, an inner facing of veneering or thin board secured to said vertical strips, horizontal cleats secured to the veneering or thin board on the inside of the crate at intervals above each other sufficient to permit the outer edges of the fruit receptacles to pass thereunder and be held down thereby, and a series of removable slats or racks supported on the said horizontal cleats, as and for the purpose set forth.

2. The crate comprising top and bottom frames, vertical strips extending around the same at intervals apart and secured to the outer faces of said frames at the respective ends of said strips, an inner facing of veneering secured between said strips and frame, horizontal cleats secured to the inner face of the veneering facing, slats secured to the bottom of the lower frame and thin yielding slats secured to and supported on the upper side of the bottom frame, substantially as described.

3. The crate comprising the top and bottom frames, vertical strips extending around the same at intervals apart and secured to the outer faces of said frames at the strips respective ends, an inner facing of veneering secured between said strips and frame, horizontal cleats secured to the inner face of the veneering, slats secured to the bottom of the lower frame, thin yielding slats secured to and supported on the upper side of the bottom frame, and a series of removable slats or racks supported on the horizontal cleats, substantially as described.

4. The crate comprising the top and bottom frame, vertical strips extending around the same at intervals apart and secured to the outer faces of said frames at the ends of said strips, an inner facing of veneering secured between said strips and frame, horizontal cleats secured to the inner face of the veneering, slats secured to the bottom of the lower frame, thin yielding slats secured to and supported on the upper side of the bottom frame, one or more intermediate fruit supporting yielding slats or racks supported at their ends by said horizontal cleats and adapted to be removed, and a top tier composed of short slats secured to cleats and formed in two sections, said sections being supported on the top horizontal cleats and the edges of the fruit basket, substantially as described and for the purpose set forth.

5. The crate comprising the top frame A and bottom frame B, vertical side strips C secured to the outer faces of said frames and connecting the same, an inner facing F of veneering or thin board held between said strips C and the frame, and slats secured to the bottom frame on the under side thereof, top strips secured on the upper frame at the sides thereof, and one or more cover boards L, having cleats on the under side adapted to project under said top strips and rest on the basket, substantially as described.

In testimony whereof I hereunto affix my signature in the presence of two witnesses.

GEO. W. WORDEN.

Witnesses:
R. M. ELLIOTT,
D. DARLEY.